United States Patent [19]
Fuller et al.

[11] Patent Number: 5,484,193
[45] Date of Patent: Jan. 16, 1996

[54] SINGLE CHANNEL BEST EFFORT ANTI-LOCK BRAKE SYSTEM

[75] Inventors: Edward N. Fuller, Manchester; Herbert L. Linkner, Jr., Dexter, both of Mich.

[73] Assignee: Kelsey-Hayes, Romulus, Mich.

[21] Appl. No.: 327,502

[22] Filed: Oct. 21, 1994

[51] Int. Cl.⁶ ........................................ B60T 8/32
[52] U.S. Cl. ................... 303/113.1; 303/114.3; 303/115.2; 303/116.1; 188/356; 60/545
[58] Field of Search ............... 303/114.3, 114.1, 303/114.2, 113.4, 113.1, 113.3, 116.1, 119.1, 113.2, 115.2, 100, 121, 127, 175, 134, 166; 60/545, 554; 188/356, 357, 358, 359, 162; 91/376 R, 369.1; 192/75

[56] References Cited

U.S. PATENT DOCUMENTS

| | | | |
|---|---|---|---|
| 3,401,982 | 9/1968 | Walker et al. | 303/114.2 |
| 3,578,820 | 5/1971 | Riordan | 303/114.3 |
| 3,586,388 | 6/1971 | Stelzer | 303/114.2 |
| 3,659,905 | 5/1972 | Goulish | 303/114.1 X |
| 3,768,874 | 10/1973 | Riordan | 303/114.1 X |
| 3,877,756 | 4/1975 | Inada et al. | 303/114.1 |
| 3,942,844 | 3/1976 | Inada et al. | 303/114.1 |
| 4,057,301 | 11/1977 | Foster | 303/114.3 |
| 4,206,605 | 6/1980 | Mehren et al. | 60/545 |
| 4,653,815 | 3/1987 | Agarwal et al. | 303/115.2 |
| 4,659,153 | 4/1987 | Klein | 303/114.3 |
| 4,819,996 | 4/1989 | Belart et al. | 303/114.3 |
| 4,828,332 | 5/1989 | Lohberg | 60/545 X |
| 4,966,420 | 10/1990 | Schiel et al. | |
| 5,000,002 | 3/1991 | Belart | 303/114.3 |
| 5,078,456 | 1/1992 | Cox | 188/162 |
| 5,195,606 | 3/1993 | Martyniuk | 303/18 |
| 5,236,257 | 8/1993 | Monzaki et al. | 303/114.1 |

FOREIGN PATENT DOCUMENTS

| | | | |
|---|---|---|---|
| 758865 | 5/1967 | Canada | 303/114.3 |
| 3619793 | 1/1987 | Germany | 303/114.1 |

*Primary Examiner*—Douglas C. Butler
*Attorney, Agent, or Firm*—Brooks & Kushman

[57] ABSTRACT

An anti-lock brake system having an electronic control responsive to wheel speed sensors associated with each wheel of the vehicle. The electronic control generates a pedal inhibit signal activating a hydraulic cylinder to inhibit further depression of the brake foot pedal in response to detecting at least one of the wheels approaching a locked state. The electronic control will also generate brake pressure control signals activating an anti-lock brake actuator connected between the brake foot pedal and the input to the vacuum power booster of the brake system. The anti-lock brake actuator, in response to the brake pressure control signals, will maintain a maximum friction between the wheels of the vehicle and the road surface.

16 Claims, 4 Drawing Sheets

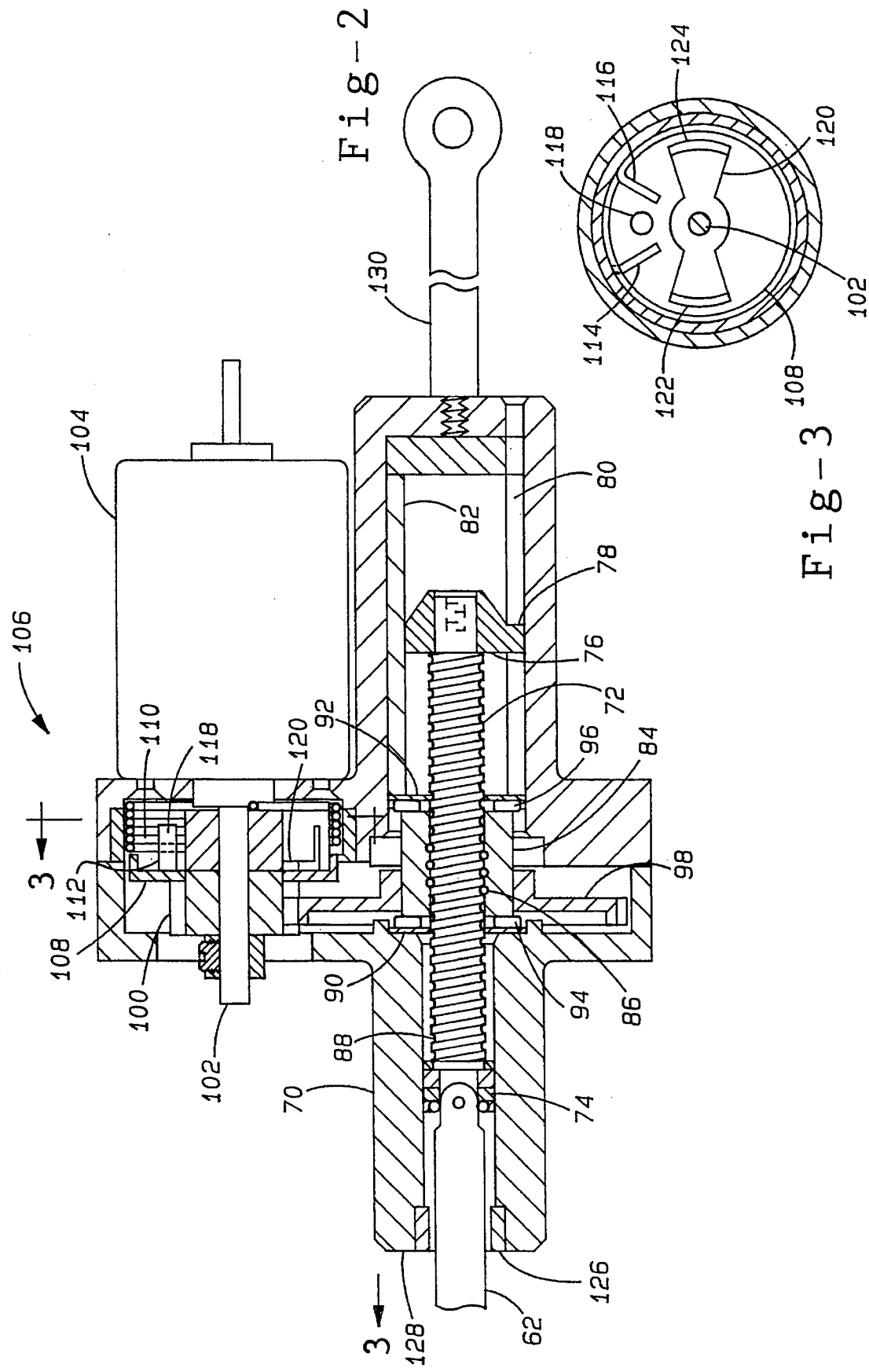

SINGLE CHANNEL BEST EFFORT ANTI-LOCK BRAKE SYSTEM

TECHNICAL FIELD

The invention is related to the field of anti-lock brake systems and, in particular, to a single channel best effort anti-lock brake system.

BACKGROUND ART

Anti-lock brake systems are finding acceptance in the automotive marketplace resulting in an increasing number of vehicles being equipped with such braking systems. The anti-lock brake systems monitor the rotational speed of two or more of the vehicle's wheels and a microprocessor detects when one or more of the wheels is approaching a locked state. The microprocessor will, in response to detecting one or more wheels approaching a locked state, reduce the braking torque being applied to the associated wheel, preventing it from locking up. These systems are designed to maintain a maximum coefficient of friction or a minimum slip condition between the wheel and the road surface. Although they work well, these systems are relatively complex and expensive.

Schiel et al, in U.S. Pat. No. 4,966,420, discloses a simplified best effort anti-lock brake system. In this system, the input to the vacuum brake booster is controlled by an ABS electronic control to reduce the braking torque to all four wheels when at least one of the wheels is detected as approaching a lock-up state. One problem with this type of anti-lock brake control is that the brake pedal pulsates when the anti-locking brake system is activated. This pulsation of the brake pedal has been found to be disturbing to many of the vehicle operators since it gives them a sense of insecurity.

The invention is a single channel best effort anti-lock brake system which eliminates the pulsation of the brake pedal, and is significantly less complex than the anti-lock brake systems currently available for automotive vehicles.

SUMMARY OF THE INVENTION

A best effort, single channel anti-lock brake system for an automotive vehicle having a foot pedal, a master brake cylinder responsive to the depression of the foot pedal to provide a pressurized brake fluid proportional to the pressure applied to the foot pedal, and a brake actuator associated with each wheel of the vehicle. The anti-lock brake system consists of at least one wheel sensor associated with at least one wheel of the vehicle which generates a wheel speed signal having a value indicative of the rotational speed of the associated wheel. An electronic control has logic capabilities for detecting when the at least one wheel is approaching a locked state to initiate an anti-lock mode of operation. The electronic control further has means for generating a foot pedal inhibit signal and a brake pressure control signal in response to the initiation of the anti-lock mode of operation. The anti-lock brake system further has means for inhibiting further depression of the foot pedal in response to the foot pedal inhibit signal and a power actuator connected to the master cylinder to control the brake fluid pressure being applied to the brake actuators by the master cylinder in response to the brake pressure control signal. The power actuator maintaining a maximum rolling friction between the wheels of the vehicle and the road surface.

One advantage of the best effort, single channel anti-lock brake system is that it is simple and relatively inexpensive.

Another advantage is that it may be applied to split diagonal or any other braking arrangement.

These and other advantages of the best effort anti-lock brake system will become more apparent from a reading of the specification in conjunction with the drawings.

BRIEF DESCRIPTION OF THE DRAWINGS

FIG. 2 is a cross-sectional view of the anti-lock power actuator;

FIG. 3 is a partial cross-section showing the details of the spring clutch;

DETAILED DESCRIPTION OF THE INVENTION

Figure 1:
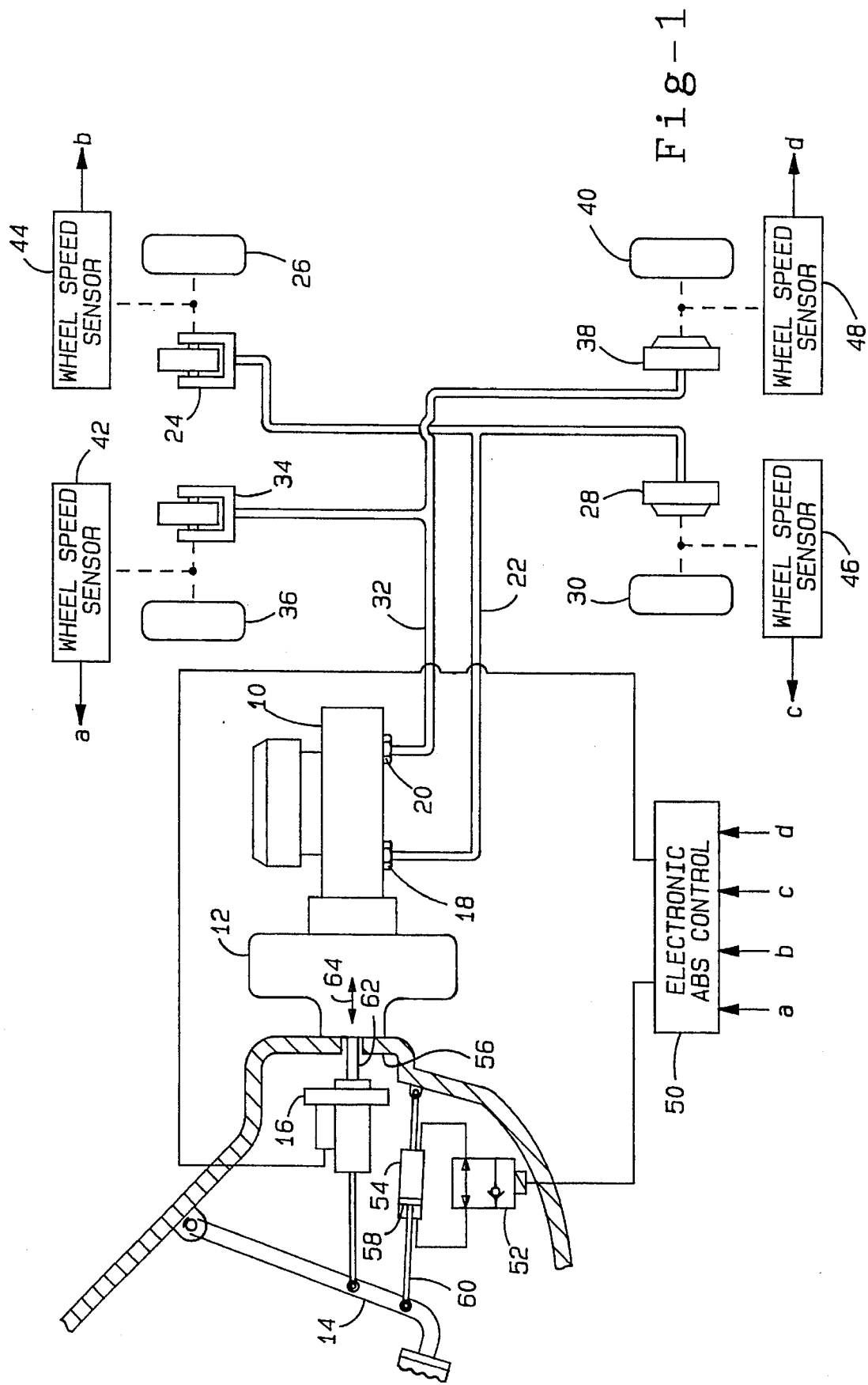
FIG. 1 is a schematic of a first embodiment of the anti-lock brake system.

A first embodiment of the single channel best effort anti-locking braking system is shown in FIG. 1. The anti-locking braking system has a tandem master brake cylinder 10 activated by a vacuum power booster 12 of conventional design known in the art. The vacuum power booster 12 is actuated by a foot pedal 14 via anti-locking brake actuator 16. As is known in the art, the tandem master cylinder 10 will produce pressurized brake fluid at its dual outlets 18 and 20 in response to the activation of the vacuum power booster 12.

A first brake line 22 connects outlet 18 of the master brake cylinder 10 to the brake actuator 24 of a first front wheel, such as right front wheel 26 of the vehicle, and to the brake actuator 28 of a first rear wheel, such as left rear wheel 30 of the vehicle. In a like manner, a second brake line 32 connects the second outlet 20 of the master brake cylinder 10 to the brake actuator 34 of the other front wheel, such as left front wheel 36 and to the brake actuator 38 of the other rear wheel, in this case, right rear wheel 40 of the vehicle.

Although the braking system illustrated in FIG. 1 is a conventional diagonally split braking system, those skilled in the art will recognize that the outlet 18 of the master brake cylinder 10 may be connected to the brake actuators 24 and 34 of the two front wheels 26 and 36 of the vehicle and outlet 20 may be connected to the brake actuators 28 and 38 of the two rear wheels 30 and 40 or vice-versa. Alternatively, outlet 18 may be connected to the brake actuators 24 and 38 on one side of the vehicle and outlet 20 may be connected to the brake actuators 28 and 34 on the other side of the vehicle.

A wheel speed sensor 42 generates a signal "a" indicative of the rotational speed of wheel 36. A wheel speed sensor 44 generates a signal "b" indicative of the rotational speed of wheel 26. A wheel speed sensor 46 generates a signal "c" indicative of the rotational speed of wheel 30, and a wheel speed sensor 48 generates a signal "d" indicative of the rotational speed of wheel 40.

An electronic ABS control 50 receives the signals a, b, c, and d and detects, in a known manner, when one or more of the wheels 26, 30, 36, and 40 is approaching a lock state, and generates a pedal inhibit signal actuating a two state solenoid valve 52. The solenoid valve 52 is connected between opposite ends of a hydraulic cylinder 54 pivotably connected at one end to a bulkhead 56 of the vehicle. A piston 58 disposed in the hydraulic cylinder 54 is attached to the foot pedal 14 via a piston rod 60.

In its unactivated state, the solenoid valve 52 provides an unrestricted fluid connection between the opposite ends of the hydraulic cylinder 54 permitting the piston 54 to be freely displaced with the actuation of the foot pedal 14 by the operator of the vehicle. In its actuated state, a check valve is placed between the opposite ends of the hydraulic cylinder 54 which prevents further depression of the foot pedal 14 and will only permit the foot pedal 14 to be returned to its rest position by a spring (not shown), in a known manner, when the operator reduces the pressure being applied to the foot pedal 14.

Simultaneous with the generation of the pedal inhibit signal, the electronic ABS control 50 will generate brake pressure control signals. The brake pressure control signals consist of sequential brake release and brake apply signals actuating the brake actuator 16 to reciprocate a rod 62 connected to the vacuum power booster. The brake actuator rod 16 will be linearly reciprocated as indicated by double-headed arrow 64.

The anti-lock brake actuator 16, in response to the brake release signal, will first reduce the pressure being applied to the input to the vacuum power booster 12 which, in turn, will reduce the brake fluid pressure being supplied by the master brake cylinder 10 to the brake actuators 24, 28, 34 and 38. The brake actuators 24, 28, 34 and 38 will respond to the reduced brake fluid pressure and reduce the braking torque applied to each of the wheels. Upon detection of the lock-up condition being terminated, the electronic ABS control 50 will generate a brake apply signal activating the anti-lock brake actuator 16 to steadily increase the force being applied to the vacuum power booster 12, thereby increasing the brake fluid pressure produced by the master cylinder 10 until one or more of the wheels is again detected as approaching a locked state. The cyclic decrease and increase of the brake fluid pressure by the anti-lock brake actuator 16 is repeated until the brake pedal 14 is released by the operator or the electronic ABS control ceases to detect the approach of a wheel lock-up condition.

This system is based on uniform road conditions and all four wheels are braked and released together. However, it is more quicker and effective than the manual pumping of the brakes by a skilled driver.

The details of the anti-lock brake actuator 16 are shown in FIG. 2. The anti-lock brake actuator 16 has a housing 70 in which a screw shaft 72 is supported at one end by a slider 74 and at the opposite end by a key 76. The key 76 has a dog 78 slidably received in a linear slot 80 provided in a sleeve 82 non-rotatably retained in the housing 70. The key 76 is fixedly attached to the end of the screw shaft 72 and prohibits the rotation of the screw shaft 72 relative to the housing 70.

The screw shaft 72, at an intermediate location, is engaged by a ball nut 84 having a plurality of balls 86 received in the grooves 88 of the screw shaft 72. A pair of retainer plates 90 and 92 and associated bearings 94 and 96 inhibit the axial displacement of the ball nut within the housing 70.

A first gear 98 is fixedly attached to the ball nut 84 and is rotatable therewith about the axis of the screw shaft 72. The first gear 98 engages a smaller second gear 100 rotatably circumscribing the output shaft 102 of a reversible DC electric motor 104. A spring clutch 106 is provided between the second gear 100 and the output shaft 102 of the motor 104 which inhibits the rotation of the gears 98 and 100 in response to linear forces applied to the screw shaft 72.

This spring clutch 106 consists of an annular plate 108 fixedly attached to the hub of the smaller gear 100 and is rotatable therewith. A helical clutch spring 110 circumscribes the output shaft 102 and in its relaxed state, its diameter expands to frictionally engage a cylindrical brake pad 112 fixedly attached to the housing 70. The clutch spring 110 has a pair of inwardly directed tangs 114 and 116 as shown in FIG. 3. The tangs 114 and 116 are angularly disposed relative to each other and are engageable by a post 118 attached to and protruding from the annular plate 108. The post 118 is disposed between the tangs 114 and 116 such that when the small gear 100 is rotated by the large gear 98 in response to linear forces applied to screw shaft 72, the post 118 will engage one or the other of the tangs 114 and 116 and produce a torque on the clutch spring 110, which will cause its diameter to further expand, increasing the frictional force between the clutch spring 110 and the brake pad 112. This also prohibits the rotation of the ball nut 84 locking the screw shaft 72 in place. This prohibits the displacement of the screw shaft 84 in response to external linear forces applied thereto.

A rotor 120, as shown in FIG. 3, is fixedly attached to the output shaft 102 of the motor 104. The rotor 120 has a pair of lips 122 and 124 which are engageable with the tangs 114 and 116 when the motor is energized. The engagement of either tang 114 or 116 by the lips 122 and 124 will produce a contraction of the clutch spring 110 which will reduce the braking force between the clutch spring 110 and the brake pad 112 and will permit the clutch spring 110 to rotate with the rotor 120. After a small rotational interval, the rotated tang will engage the post 118 and rotate the annular plate 108 and the gears 100 and 98 resulting in a linear displacement the screw shaft 72. When the motor 104 is deenergized, the rotation of the rotor 120 will be terminated, removing the force being applied to the tang and the diameter of the clutch spring 110 will expand once more frictionally engaging the brake pad 112.

The brake actuator rod 62, shown in FIG. 1, is attached to the screw shaft 72 adjacent to the slider 74. A bronze or plastic bearing 126 may be disposed at the exit end 128 of the housing 70 to reduce the friction between the brake actuator rod 62 and the housing 70 as it is linearly displaced by the screw shaft 72. A connector rod 130 is fixedly attached to the opposite end of the housing 70 and connects the anti-lock brake actuator 16 to the foot pedal 14 as shown in FIG. 1.

In operation, when the electronic ABS control 50 senses that at least one of the wheels is approaching a locked-state, it will first generate a brake release signal activating the reversible DC motor 104 to rotate its output shaft in a direction retracting the brake actuator rod 62. This will reduce the pressure being applied to the vacuum power booster 12, thereby reducing the pressure of the brake fluid being applied to the brake actuators 24, 28, 34 and 38. Upon sensing the termination of the condition of the wheels approaching the locked state, the electronic ABS control will generate a brake apply signal activating the motor 104 to run in the reverse direction displacing the brake actuator rod 62 in a direction to increase the pressure of the brake fluid being applied to the brake actuators until at least one of the wheels starts to approach a locked state.

Figure 4:
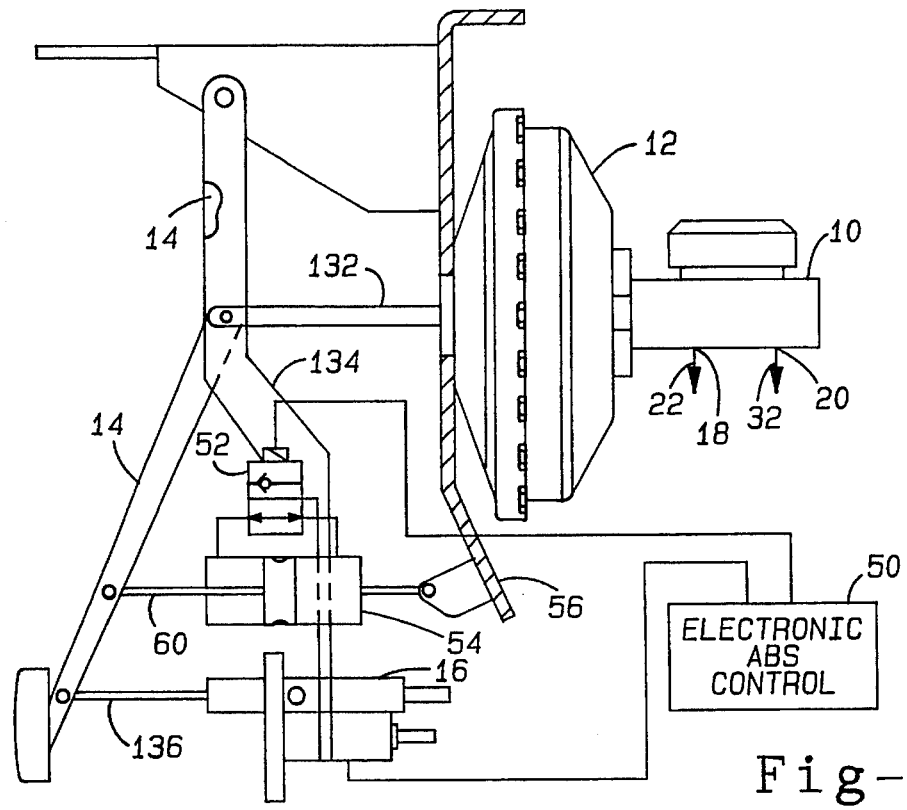
FIG. 4 is a schematic of a second embodiment of the anti-lock brake system.

A second embodiment of the single channel best effort anti-lock brake system is shown in FIG. 4. In this embodiment, the brake pedal 14 is connected to the bulkhead 56 of the vehicle by the hydraulic cylinder 54 and the piston rod 60 as previously discussed relative to FIG. 1. In a like manner, a solenoid valve 52 actuated the electronic ABS control 50 will inhibit further depression of the brake pedal 14 when actuated in response to the electronic ABS control 50 executing its anti-lock control function in response to detecting at least one of the wheels approaching a locked state.

The input rod 132 of the vacuum power booster 12 is pivotably connected to a lever 134 pivotably supported from the bulkhead 56. The lever 134 may be pivoted at a location coaxial with the pivot axis of the brake pedal 14, as shown, or may be pivotably attached to the bulkhead at any other location. The lever 134 is connected to the brake pedal 14 via the anti-lock power actuator 16 and the connector rod 136. In this embodiment, the anti-lock power actuator is connected directly to the lever 136 and the connector rod 136 is equivalent to connector rod 62 shown in FIG. 1.

In operation, the electronic ABS control 50 generates a brake pedal inhibit signal switching the solenoid valve 52 to its activated state in response to detecting one of the vehicle's wheels approaching a locked state. In its activated state, the solenoid valve 52 prohibits further depression of the brake pedal 14 but allows the brake pedal to be returned toward its rest position when the operator reduces the force being applied thereto. The power brake actuator 16, in response to a brake release signal generated by the electronic ABS control, will displace the lever 134 toward the brake pedal 14 reducing the force being applied to the input to the vacuum power booster 12. This will reduce the fluid pressure being applied to the brake actuators, reduce the braking torque being applied to the wheels, and prevent the wheel from locking up. Upon detecting when the wheel is no longer approaching the locked state, the electronic ABS control will generate a brake apply signal activating the anti-lock power actuator to displace the lever 134 away from the brake pedal. This will increase the force being exerted on the input to the vacuum power booster 12 by the input rod 132 which, in turn, will increase the fluid pressure of the brake fluid being applied to the brake actuators and the braking torque being applied to the wheels until the electronic ABS once more detects one or more of the wheels approaching a locked state. This cycle is repeated until the operator releases the brake pedal 14 or the electronic ABS ceases to detect the state where one or more of the wheels is approaching a locked state.

Figure 5:
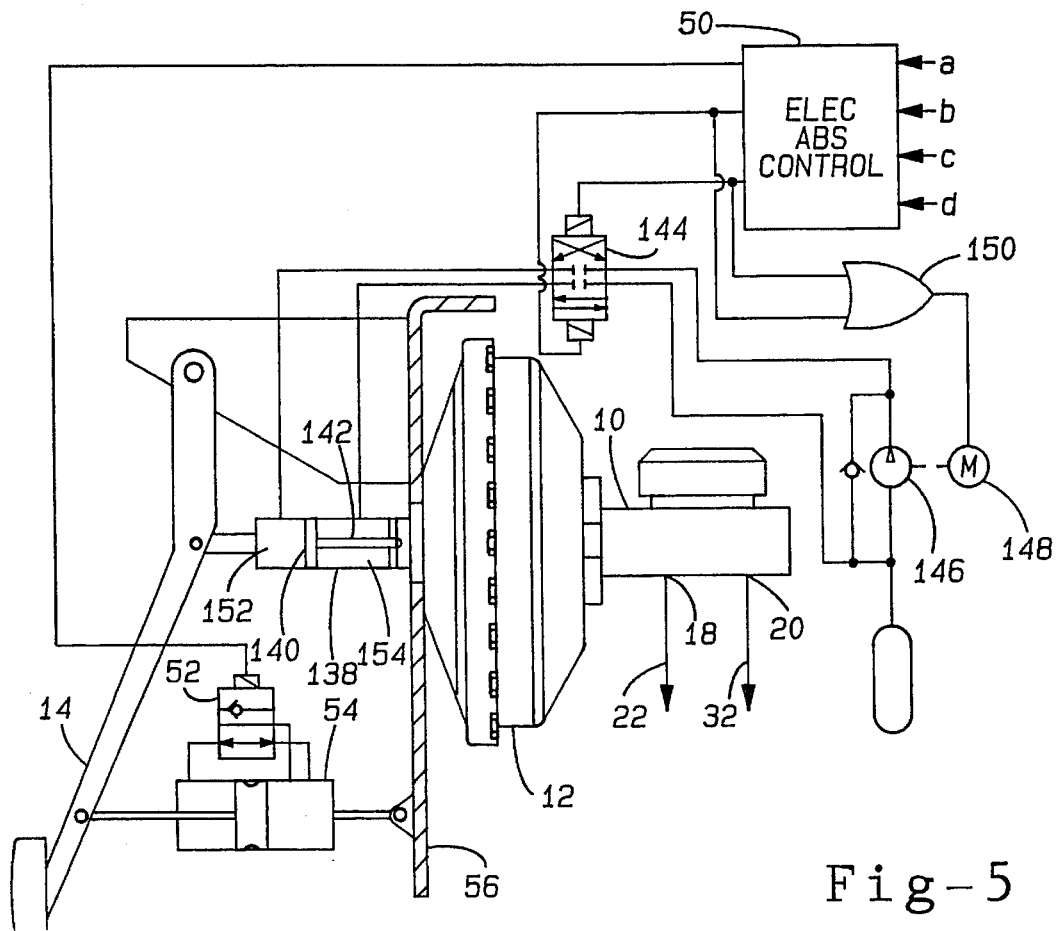
FIG. 5 is a schematic of a third embodiment of the anti-lock brake system.

A third embodiment of the single channel best effort anti-lock brake system is shown in FIG. 5. As in the two prior embodiments, a hydraulic cylinder 52 controlled by a two state solenoid valve 52 is connected between the brake foot pedal 14 and the bulkhead 56 of the vehicle. The solenoid valve 52 is activated to its second state in response to a brake pedal inhibit signal generated by the electronic ABS control 50 in response to detecting one or more of the wheels approaching a locked stated. As previously discussed, the solenoid valve 52 prohibits further depression of the foot pedal 14 but will permit the foot pedal 14 to be returned to its rest position when the operator reduces the force being applied to the foot pedal.

In this embodiment, the anti-lock power actuator 16 takes the form of a hydraulic cylinder 138 having one end connected to the brake pedal 14. The piston 140 of the hydraulic cylinder is connected to the input of the vacuum power booster 12 by means of a piston rod 142. The displacement of the piston is controlled by a three-way solenoid valve 144 connected to a fluid pump 146. The fluid pump 146 is connected to an electric motor 148 which is activated by either the "brake release" or "brake apply" signals generated by the electronic ABS control 50, as symbolized by OR gate 150. In the relaxed state of the three-way solenoid valve 144, the piston chambers of the hydraulic cylinder on opposite sides of the piston 140 are isolated from each other and from a fluid pump 146, inhibiting the displacement of the piston 140. The three-way solenoid valve is activated to a second state in response to the brake release signal generated electronic ABS control in response to detecting at least one of the wheels approaching a locked state. In this second state, the pump 146 will pump fluid from chamber 152 of the hydraulic cylinder 138 and into chamber 154 displacing the piston 140 in a direction away from the vacuum power booster 12. This will displace the piston 140 and piston rod 142 in a direction reducing the force being applied to the input of the vacuum power booster which, in turn, reduces the fluid pressure output from the master cylinder 10, thereby reducing the braking torque being applied to the wheels. Upon detecting that the wheel is no longer approaching a locked state, the electronic ABS control will generate a brake apply signal switching the three-way solenoid valve 144 to its third state in which the pump 146 will pump fluid from chamber 154 into chamber 152 displacing the piston 140 and piston rod 142 toward the vacuum power booster 12. This will increase the pressure output from the master brake cylinder 10 and increase the braking torque being applied to the wheels. The electronic ABS control once again detects at least one wheel approaching a locked state. This cycle will repeated until either the operator releases the pressure being applied to the foot pedal 14 or the electronic ABS control ceases to detect one or more wheels approaching a locked state.

The operation of this third embodiment is substantially the same as the first embodiment shown in FIG. 1 and need not be discussed in detail for an understanding of the invention.

Figure 6:
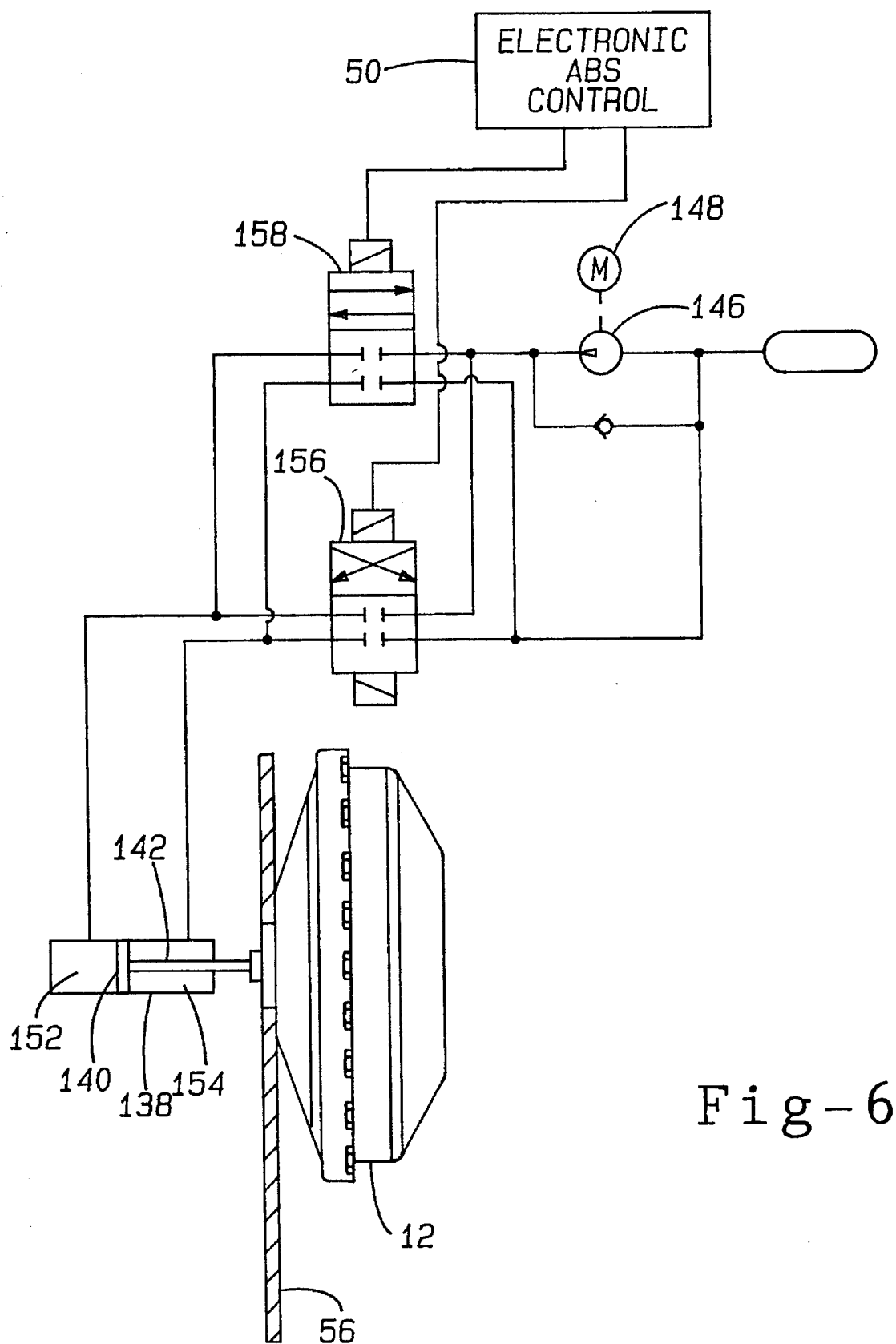
FIG. 6 is an alternate hydraulic circuit for the third embodiment of the anti-lock brake system.

The three state solenoid valves 144 may be replaced by two, two state solenoid valves 156 and 158 connected in parallel as shown in FIG. 6. In this embodiment, two state solenoid 156 has a unactivated state disconnecting the chamber 152 and 154 from each other and from the pump 146 and an activated state in response to the brake release signal generated by electronic ABS control to permit fluid to be pumped from chamber 152 into chamber 154 reducing the pressure being applied to the input to the vacuum brake booster. The two state solenoid valve 158 has an unactivated state disconnecting the chambers 152 and 154 from each other and from the pump 146 and an activated state in response to the apply brake signal generated by the electronic ABS control 50 permitting the pump 146 to pump fluid from chamber 154 into chamber 152, displacing the piston 140 toward the vacuum power booster 12, thereby increasing the force applied to the input of the vacuum power booster and thus the braking force being applied to the brake actuators.

While the best mode for carrying out the invention has been described in detail, those familiar with the art to which this invention relates will recognize various alternative designs and embodiments for practicing the invention as defined by the following claims.

What is claimed is:

1. A best effort single channel anti-lock brake system for an automotive vehicle having a foot pedal, a master brake cylinder responsive to the depression of the foot pedal to provide pressurized brake fluid proportional to the pressure applied to said foot pedal and a brake actuator associated with each wheel of the vehicle, said anti-lock brake system comprising:

at least one wheel speed sensor associated with at least one of the wheels of the vehicle, said at least one wheel speed sensor generating a wheel speed signal having a value indicative of the rotational speed of said at least one wheel;

an electronic control having logic means for detecting when said at least one wheel is approaching a locked state to initiate an anti-lock mode of operation in response to said wheel speed signal, said electronic control further comprising means for generating a foot pedal inhibit signal and cyclic brake pressure control signals in response to said logic means being in said anti-lock mode of operation;

means connected between the foot pedal and a stationary member of the vehicle for inhibiting further depression of the foot pedal in response to said foot pedal inhibit signal; and means independent of said means for inhibiting connected between the foot pedal and the master cylinder for cyclically controlling the brake fluid pressure applied to the brake actuators by the master cylinder in response to said cyclic brake pressure control signals, said cyclically controlled brake fluid pressure selected to maintain a maximum friction between the wheels of said vehicle and the road surface being engaged by said wheels.

2. The anti-lock brake system of claim 1 wherein said at least one wheel speed sensor is a plurality of wheel speed sensors, one wheel speed sensor associated with a respective one of the wheels of the vehicle, and wherein said logic means initiates said anti-lock mode of operation in response to at least one of the wheel speed signals generated by said plurality of wheel speed sensors indicating that said at least one wheel is approaching a locked state.

3. The anti-lock brake system of claim 1 wherein said means for inhibiting comprises:

a hydraulic cylinder connected between the foot pedal and said stationary member of the vehicle, said hydraulic cylinder having a piston displaceable therein dividing the interior of said hydraulic cylinder into a front chamber and a rear chamber; and a solenoid valve connected between said front chamber and said rear chamber, said solenoid valve having an inactive state providing an unrestricted fluid path between said front and rear chambers permitting the foot pedal to be displaced to and from a rest portion and an activated state providing a unidirectional fluid flow in response to the foot pedal inhibit signal, the unidirectional fluid flow inhibiting said foot pedal from being further depressed.

4. The anti-lock brake system of claim 3 wherein the master brake cylinder includes a vacuum booster having an input member responsive to said means for controlling the brake fluid pressure.

5. The anti-lock brake system of claim 4 wherein said means for controlling comprises an anti-lock brake actuator having a first arm connected to the foot pedal and a second arm connected to said input to the vacuum booster, said anti-lock brake actuator responsive to said brake pressure control signal to control the force being applied to said input of said vacuum booster to maintain said maximum friction between said wheels and said road surface.

6. The anti-lock brake system of claim 3 wherein said means for controlling comprises:

a lever pivotably connected at one end to a stationary member of said vehicle and pivotably connected to said input of said vacuum booster at a location displaced from said one end; and an anti-lock brake actuator having a first arm connected to the foot pedal and a second arm attached to said lever, said anti-lock brake actuator responsive to said brake pressure control signal to displace said lever relative to the foot pedal to control the force being applied to said input member of said vacuum booster to maintain said maximum rolling friction between said wheels and said road surface.

7. The anti-lock brake system of claim 5 wherein said anti-lock brake actuator comprises:

a housing having said first arm attached to one end thereof;

a linearly displaceable member having a first end portion slidably received in said housing and an external end portion, said external end portion extending out of said housing at an end opposite said one end, said external end portion constituting said second arm; and means for linearly displacing said displaceable member relative to said housing in response to said brake pressure control signal.

8. The anti-lock brake system of claim 5 wherein said first end portion of said linearly displaceable member is a screw shaft and said means for linearly displacing comprises a nut engaging said screw shaft and an electric motor activated by said brake pressure control signals to rotate said nut.

9. The anti-lock brake system of claim 8 further including a spring clutch having a first state inhibiting the rotation of the nut by a linear displacement of said screw shaft and a second state permitting said nut to be rotated by said motor.

10. The anti-lock brake system of claim 9 wherein said brake pressure control signals comprise, in the alternative, a forward signal and a reverse signal, and wherein said motor is a reversible motor responsive to said forward signal to rotate said nut in a direction to displace said displaceable shaft in a first direction increasing the force being applied to said input of said vacuum booster and responsive to said reverse signal to rotate said nut in a direction to displace said displaceable shaft in the opposite direction, reducing the force being applied to said input of said vacuum booster.

11. The anti-lock brake system of claim 3 wherein said means for controlling the brake fluid pressure comprises:

a hydraulic cylinder having one end connected to one of said first and second arms and a piston connected to the other end of said first and second arms;

a hydraulic pump activated in response to said electric control being in said anti-lock mode; and at least one solenoid valve activated in response to said brake pressure control signal to control the displacement of said piston to maintain a maximum friction between the wheels of said vehicle and the road surface being engaged by said wheels.

12. The anti-lock brake system of claim 11 wherein said hydraulic cylinder has a first chamber disposed on one side of said piston and a second chamber disposed on the opposite side of said piston, and wherein said brake pressure control signals comprise alternating forward signals and reverse signals, and wherein said at least one solenoid valve is a three-way solenoid having an unactivated state blocking fluid transfer between said first and second chambers in response to said forward signal, a first activated state permitting said pump to pump fluid from said first chamber to said second chamber to increase the pressure being applied to the input of the master cylinder and a second activated state in response to said reverse signal permitting said pump to pump fluid from said second chamber to said first chamber to decrease the pressure being applied to the input of the master cylinder.

13. The anti-lock brake system of claim 11 wherein said hydraulic cylinder has a first chamber disposed on one side of said piston and a second chamber disposed on the opposite side of said piston, and wherein said brake pressure control signals comprise alternating forward and reverse signals, and wherein said at least one solenoid valve comprises:

a first solenoid valve connected between said pump and said first and second chambers, said first solenoid valve having an unactivated state blocking a fluid flow between said first and second chambers and an activated state in response to said forward signal permitting said pump to transfer fluid from said first chamber to said second chamber to increase the pressure applied to said master cylinder; and a second solenoid valve connected in parallel with said first solenoid valve between said pump and said first and second chambers, said second solenoid valve having an unactivated state blocking a fluid transfer between said first and second chambers and an activated state in response to said reverse signal permitting said pump to transfer fluid from said second chamber to said first chamber decreasing the braking pressure being applied to the input of said master cylinder.

14. A best effort single channel anti-lock brake system for an automotive vehicle, said automotive vehicle having a foot pedal, a master brake cylinder connected to the foot pedal producing a pressurized brake fluid proportional to the pressure applied to the foot pedal, and a brake actuator associated with each wheel of the vehicle, said anti-lock brake system comprising:

a wheel speed sensor associated with each wheel of the vehicle, each wheel speed sensor generating a wheel speed signal having a value corresponding to the rotational speed of the associated wheel;

an electronic control responsive to said wheel speed signals to generate a pedal inhibit signal and cyclic brake pressure control signals in response to at least one of said wheel speed signals being indicative of its associated wheel approaching a locked state;

means connected between the foot pedal and a stationary member of the vehicle for inhibiting the further depression of the foot pedal in response to said pedal inhibit signal; and an anti-lock brake actuator independent of said means for inhibiting connected between the foot pedal and the master brake cylinder for cyclically controlling the brake pressure being applied to the brake actuators by the master cylinder to inhibit the wheels of the vehicle from locking-up while maintaining maximum braking friction between the wheels and the road surface in response to said cyclic brake pressure control signals.

15. A best effort single channel anti-lock brake system for an automotive vehicle, said automotive vehicle having a foot pedal, a master brake cylinder connected to the foot pedal producing a pressurized brake fluid proportional to the pressure applied to the foot pedal, and a brake actuator associated with each wheel of the vehicle, said anti-lock brake system comprising:

a wheel speed sensor associated with each wheel of the vehicle, each wheel speed sensor generating a wheel speed signal having a value corresponding to the rotational speed of the associated wheel;

an electronic control responsive to said wheel speed signals to generate a pedal inhibit signal and brake pressure control signals in response to at least one of said wheel speed signals being indicative of its associated wheel approaching a locked state;

means for inhibiting the further depression of the foot pedal in response to said pedal inhibit signal;

a lever having one end pivotably connected to a stationary member of said vehicle and pivotably connected to the input of the master brake cylinder; and an anti-lock brake actuator connected between the foot pedal and said lever at a location remote from said one end, said anti-lock brake actuator responsive to said brake pressure control signals to reciprocate said lever relative to said foot pedal to control the pressure of the brake fluid being applied to the brake actuators to inhibit the wheels of the vehicle from locking-up while maintaining maximum braking friction between the wheels and the road surface being engaged by the wheels.

16. A best effort single channel anti-lock brake system for an automotive vehicle, said automotive vehicle having a foot pedal, a master brake cylinder connected to the foot pedal producing a pressurized brake fluid proportional to the pressure applied to the foot pedal, and a brake actuator associated with each wheel of the vehicle, said anti-lock brake system comprising:

a wheel speed sensor associated with each wheel of the vehicle, each wheel speed sensor generating a wheel speed signal having a value corresponding to the rotational speed of the associated wheel;

an electronic control responsive to said wheel speed signals to generate a pedal inhibit signal and brake pressure control signals in response to at least one of said wheel speed signals being indicative of its associated wheel approaching a locked state;

means for inhibiting the further depression of the foot pedal in response to said pedal inhibit signal;

a hydraulic cylinder disposed between the foot pedal and the master brake cylinder, said hydraulic cylinder having a piston and a piston rod connected to said piston, said hydraulic cylinder having a first chamber on one side of said piston and a second chamber on the opposite side of said cylinder;

a fluid pump for producing a fluid flow between said first and second chambers; and at least one solenoid valve activated in response to said brake pressure signals to reciprocate said piston to control the pressure of the fluid being applied to the brake actuators from the master brake cylinder to inhibit the wheels of the vehicle from locking-up while maintaining maximum braking friction between the wheels and the road surfaces being engaged by the wheels.

* * * * *